United States Patent
Sloot

(10) Patent No.: US 6,446,571 B1
(45) Date of Patent: Sep. 10, 2002

(54) LIGHT REFLECTING WARNING KIT FOR VEHICLES

(75) Inventor: Alexander Sloot, Sugarloaf, PA (US)

(73) Assignee: Printmark Industries, Inc., Hazleton, PA (US)

(*) Notice: Subject to any disclaimer, the term of this patent is extended or adjusted under 35 U.S.C. 154(b) by 16 days.

(21) Appl. No.: 09/769,101

(22) Filed: Jan. 25, 2001

(51) Int. Cl.$^7$ .............................. E01F 9/04; G08B 5/00
(52) U.S. Cl. ..................... 116/63 P; 116/28 R; 116/209
(58) Field of Search ..................... 116/63 R, 63 P, 116/63 T, 28 R, 30, 209, 35 R; 40/591, 612

(56) References Cited

U.S. PATENT DOCUMENTS

| | | | | |
|---|---|---|---|---|
| 5,020,466 A | * | 6/1991 | Mätzener | 116/63 P |
| 5,303,668 A | * | 4/1994 | Huang | 116/63 P |
| 5,349,920 A | * | 9/1994 | Koizumi | 116/28 R |
| 5,398,437 A | * | 3/1995 | Bump, Jr. et al. | 116/28 R |
| 5,780,140 A | * | 7/1998 | Nilsen | 40/612 |
| 6,286,224 B1 | * | 9/2001 | Lewis | 33/562 |

FOREIGN PATENT DOCUMENTS

DE  3408158 A1  *  9/1985  ............... 116/63 P

* cited by examiner

*Primary Examiner*—Christopher W. Fulton
*Assistant Examiner*—Travis Reis
(74) *Attorney, Agent, or Firm*—St. Onge, Steward, Johnston & Reens LLC

(57) ABSTRACT

A kit includes a retro-reflective sheet made from a flexible plastic material and provided with a plurality of seams, which define therebetween a plurality of detachable warning signs, and a means for attaching these signs to an object so as to increase its conspicuity by reflecting a light beam in a direction reverse to a direction of light incidence.

10 Claims, 3 Drawing Sheets

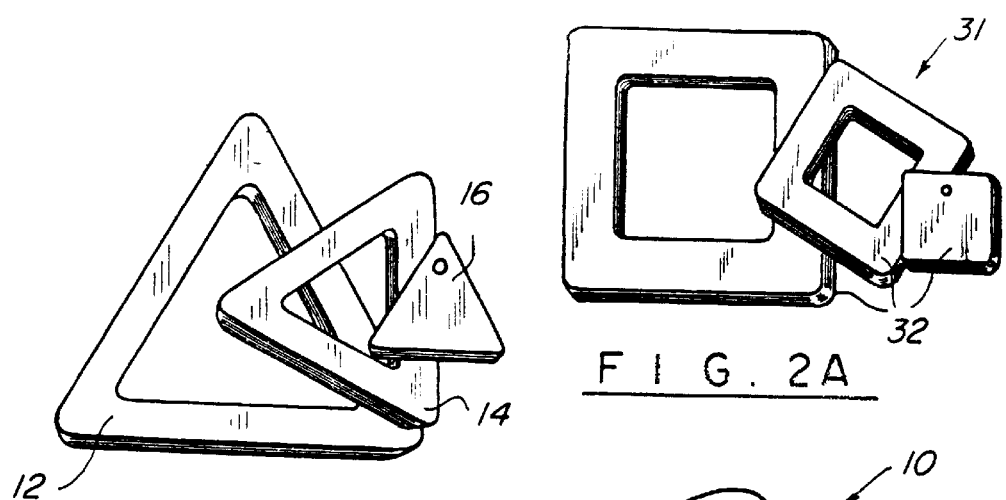
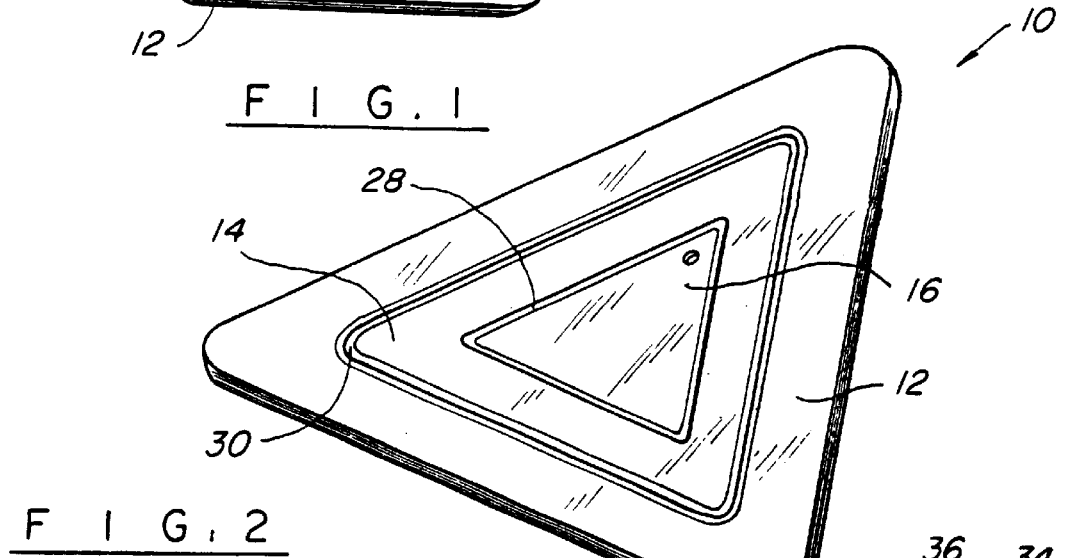
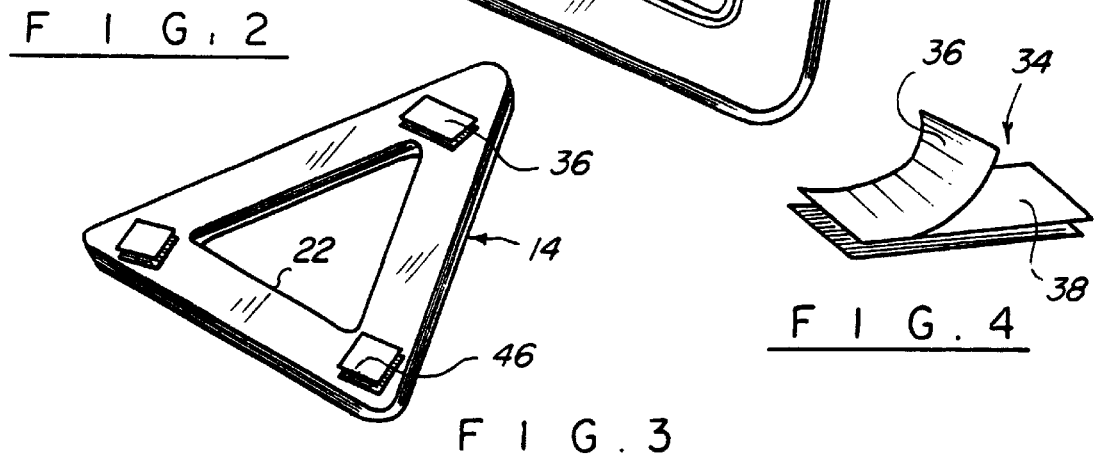
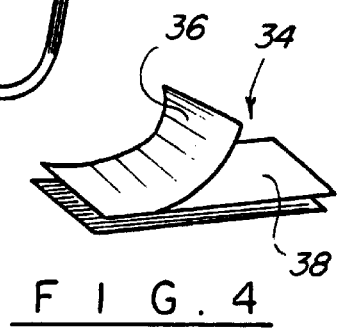
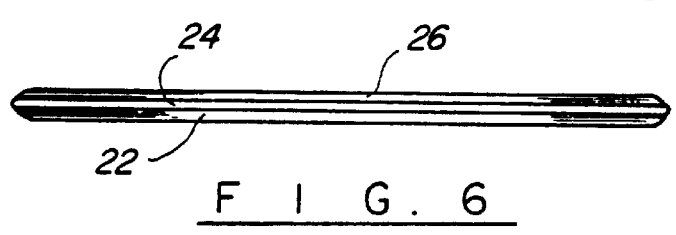
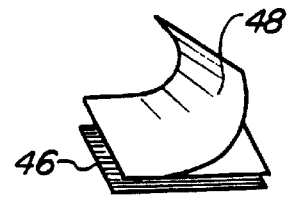

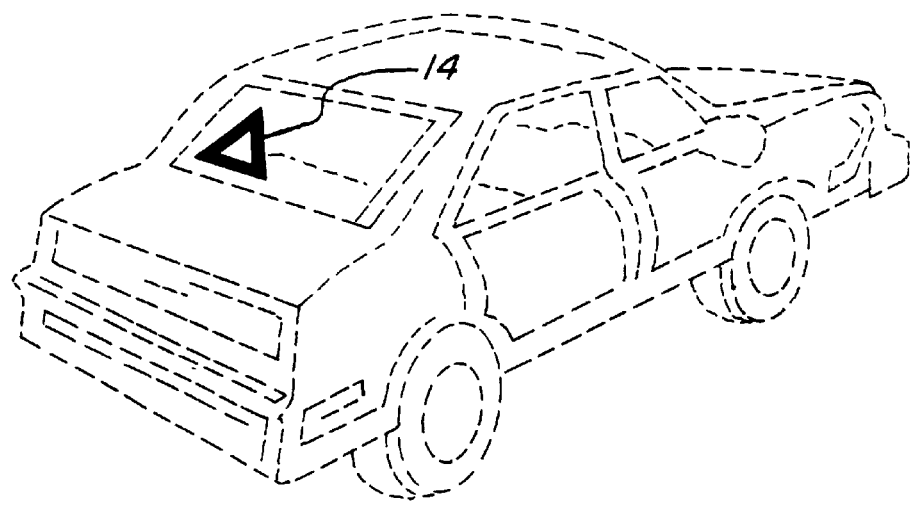
F I G. 7
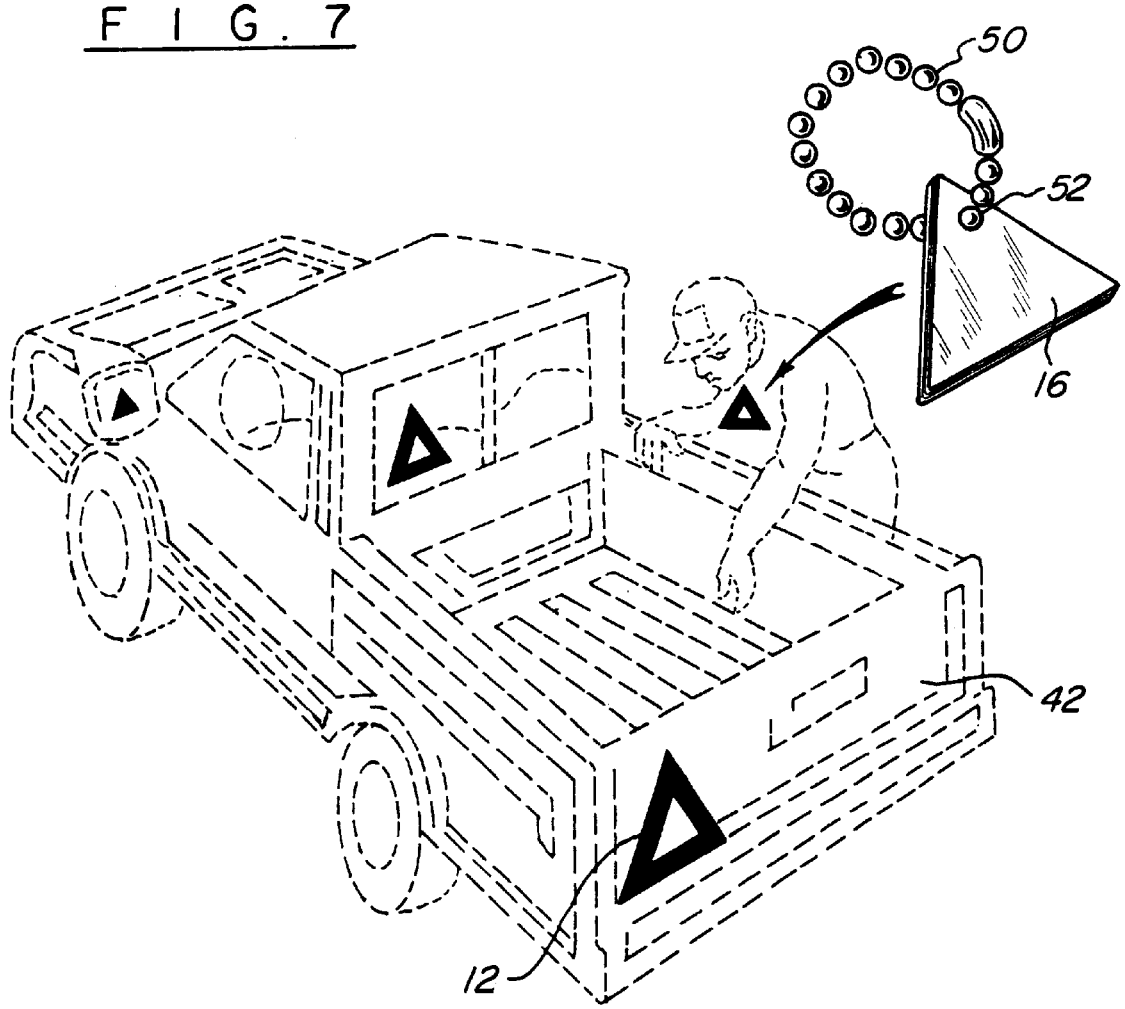
F I G. 8

LIGHT REFLECTING WARNING KIT FOR VEHICLES

FIELD OF THE INVENTION

The invention relates to a kit including a sheet of material, which has a plurality of detachable retro-reflective warning signs, and a means for attaching each of these signs to an object in order to increase the object's conspicuity.

BACKGROUND OF THE INVENTION

With the dawn of the automobile came the need for safety traffic control devices. The increase of automobile use around the clock necessitated the use of light reflectors of various designs and configurations, as known in the prior art. More specifically, light reflectors of various configurations devised and utilized for the purpose of employing reflected light from an object through the use of a large number of methods and apparatuses have been developed for the fulfillment of countless objectives and requirements.

Thus, for instance, with a traffic or warning sign, a reflective sheet utilizing a retro-reflective property, that is, a property of reflecting a light beam in a direction reverse to a direction of light incidence, is widely used. Most times when a vehicle breaks down, the driver will manage to guide it off the shoulder or roadside. However, it all too often happens that a speeding vehicle will slam into the disabled one, creating an unnecessary accident especially during low-light conditions such as at dusk, in the dark, or early dawn. Similarly, a driver of a disabled car can expose himself/herself to a speeding vehicle when she steps out of the disabled vehicle parked on a roadside. The incidents of this kind of out of the disabled vehicle parked on a roadside. The incidents of this kind of accident hopefully can be somewhat reduced if both the disabled vehicle and its driver had easily detachable reflective warning signs to alert drivers of approaching vehicles about a disabled one stopped on a roadside.

It is therefore, desirable to provide a kit having a combination of detachable reflective warning signs preferably made of vinyl and a means for attaching these signs to a variety of surfaces.

SUMMARY OF THE INVENTION

To attain this, the present invention essentially comprises a set of a plurality of reflective warning signs, which can be easily separated from one another and conveniently stored in the glove compartment or trunk of a vehicle for emergency use.

With a reflective warning sign in accordance with the invention, reflectivity is obtained while the disabled vehicle and/or its driver are also more likely to be observed by a driver of another vehicle from a retro-reflection of the vehicle's head lights.

This is achieved in accordance with one aspect of the invention by providing a combination of detachable reflective signs which are differently sized. Preferably, a sheet of reflective material has a plurality of endless seams that define borders between neighboring signs. Typically, the sheet of material includes an array of uniformly shaped signs, wherein a larger sign surrounds a smaller sign. However, the sheet of material may be composed of a plurality of signs which are arranged in a pattern including a plurality of rows and columns. A shape and size of the signs vary to enable a user to attach them to different objects which are to be illuminated by the lights of approaching vehicles.

The sheet of material is preferably composed of a back-up layer, an intermediate retro-reflective layer and a covering layer. The back-up and covering layers are made of thermoplastic flexible materials. Characteristically, the intermediate retro-reflective layer is encapsulated between the top and back layers. Alternatively, the sheet of material may be composed of only two layers, one of which is a retro-reflective layer and the other one is a vinyl layer.

The inventive kit also includes a means for attaching the signs to different parts of a vehicle and its driver. The attaching means can not only provide a reliable longtime attachment of the signs, but it also allows a user to remove the thus attached signs immediately after an emergency situation ceases to exist.

Accordingly, it is an object of the invention to provide a kit which includes a sheet of material that consists of a plurality of detachable interconnected retro-reflective signs, each of which is can be mounted to a vehicle, which is parked along a roadside, and/or to its driver to reflect a light beam emitted from approaching vehicles.

Still another object of the invention is to provide a kit which includes a combination of releasable retro-reflective warning signs and an attaching means for temporarily attaching the signs to a vehicle and/or to its driver in case of emergency.

Other objects and advantages of this invention will become apparent from the following description taken in conjunction with the accompanying drawings wherein set forth, by way of illustration and example, certain embodiments of this invention.

BRIEF DESCRIPTION OF THE DRAWINGS

FIG. 1 is an elevational perspective view of a combination of retro-reflective signs which are detached from one another in accordance with the invention.

FIG. 2 is a perspective view of a combination of interconnected retro-reflective warning signs made of retro-reflective material in accordance with the invention.

FIG. 2A is a perspective view of a combination of retro-reflective warning signs in accordance with another embodiment of the invention.

FIG. 3 is a perspective view of the detached retro-reflective sign which is provided with a means for attaching it to an object.

FIG. 4 is a perspective view of adhesive pads for attaching the retro-reflective signs to an object in accordance with the invention.

FIG. 5 is a perspective view of magnetic means for attaching the retro-reflective signs to an object in accordance with the invention.

FIG. 6 is a cross-sectional view of a retro-reflective sign of FIGS. 1–3.

FIG. 7 is one of possible applications of a retro-reflective sign according to the invention.

FIG. 8 is another application of a retro-reflective sign in accordance with the invention.

DETAILED DESCRIPTION OF THE DRAWINGS

Figure 9:
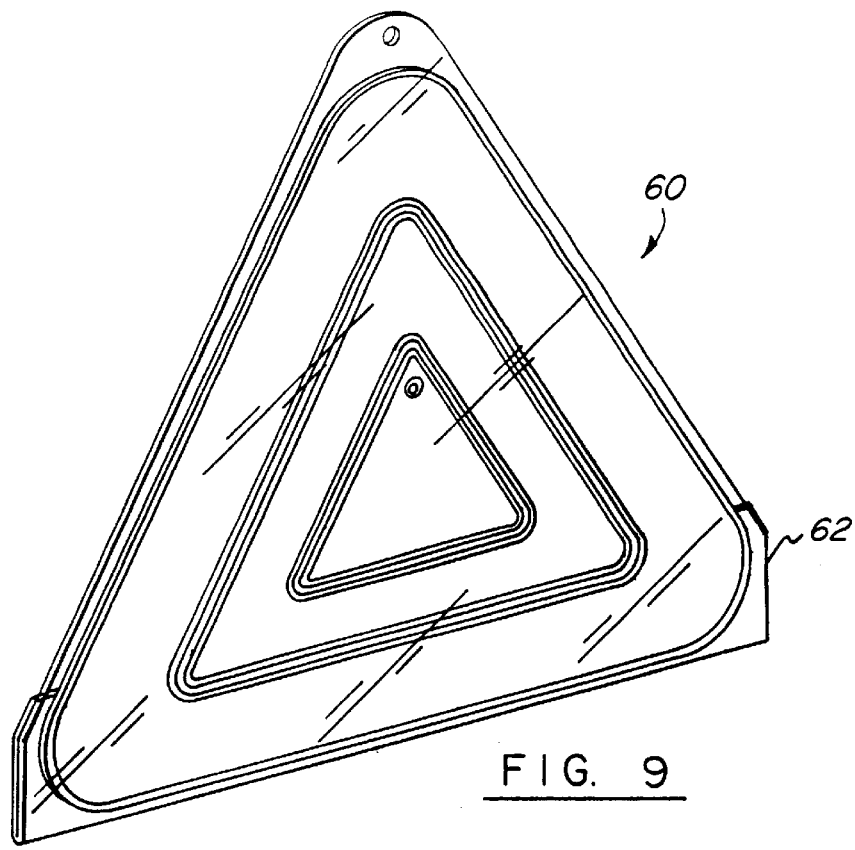
FIG. 9 illustrates a front view of a kit in accordance with the invention.

Referring to FIGS. 1–6, three retro-reflective components, such as warning signs including outer, intermediate and inner signs 12, 14 and 16, respectively, are attached to one another. While a shape and size of the signs may vary, the signs shown in FIGS. 1–2 are differently dimensioned. Specifically, as shown in FIG. 6, the sheet 10 has a base layer 22, a layer of reflective material or reflective layer 24, and a covering layer 26 affixed to one another by any appropriate method. Some such methods may include sonic vibration or RF fusing. As the layers are bonded together in a mold, its severing edges pierce the sheet 10 to form seams 28, 30 between outer and intermediate signs 12, 14 and intermediate and inner signs 14, 16, respectively. As a consequence, one can easily detach each of the signs by applying an external force along the seams, as shown in FIG. 1.

Note, that although the signs shown in FIGS. 1, 2 have a triangular shape and are formed within one another, other shapes are contemplated within the scope of the invention. For example, referring to FIG. 2A, a generally square-shaped sheet 31 consists of a plurality of polygonal signs 32 that can be separated from one another along the respective seams. Other shapes, such as a circular one, are obvious modifications of the inventive concept.

Referring again to FIG. 6, the intermediate retro-reflective layer 24 is completely enclosed within a pocket formed by top and bottom layers. The base layer 22 may be composed of any suitable material, such as vinyl, urethane or any other light, flexible, plastic material capable of being processed by a sealing method, which may include RF and sonic vibration techniques. The covering layer 26 may be transparent and colored to enhance the reflectivity of the intermediate retro-reflective layer 24. Preferably, the covering layer 26 is made of a "firm-hand" PVC vinyl and may be imprinted on either of its opposite sides with an appropriate symbol or legend. Alternatively to the embodiment shown in FIG. 6, the sheet 10 may consist of only two layers, one of which is a retro-reflective layer.

Referring to FIGS. 3–5, the inventive kit also contains a means for attaching the warning signs. As illustrated in FIG. 4, the attaching means can include a pad 34 having opposite sides which are covered with a pressure sensitive or heat sensitive material 38. A removable cover 36 which is detached immediately before the sign is to be used, in turn, covers this material.

As shown in FIG. 3, the pads can be first attached to one of the signs that has been separated from the sheet 10, and then the sign can be easily attached to a surface by simply urging the sign against this surface. Thus, for example, as shown in FIG. 7, the warning sign 14 is attached to a rear window of a vehicle. It is understood that instead of an adhesive tape pad, other attaching materials, such as Velcro® hook and loop fasteners, can be used.

Another type of the attaching means constituting the kit is illustrated in FIG. 5 and includes a combination of magnets 46 that may have different dimensions. One of the opposite sides of the magnet can be covered with an adhesive layer, which receives the sign after the removal of a protective cover 48. As illustrated in FIG. 8, a warning sign 12 is attached to a body 42 of the vehicle by means of the magnet 46.

Further, as shown in FIG. 8, the attaching means includes a chain 50 that can be threaded through a hole 52 of the smallest sign 16. As a consequence, such structure can be used as a zipper pull to refectorize the driver attending to a disabled vehicle.

Figure 10:
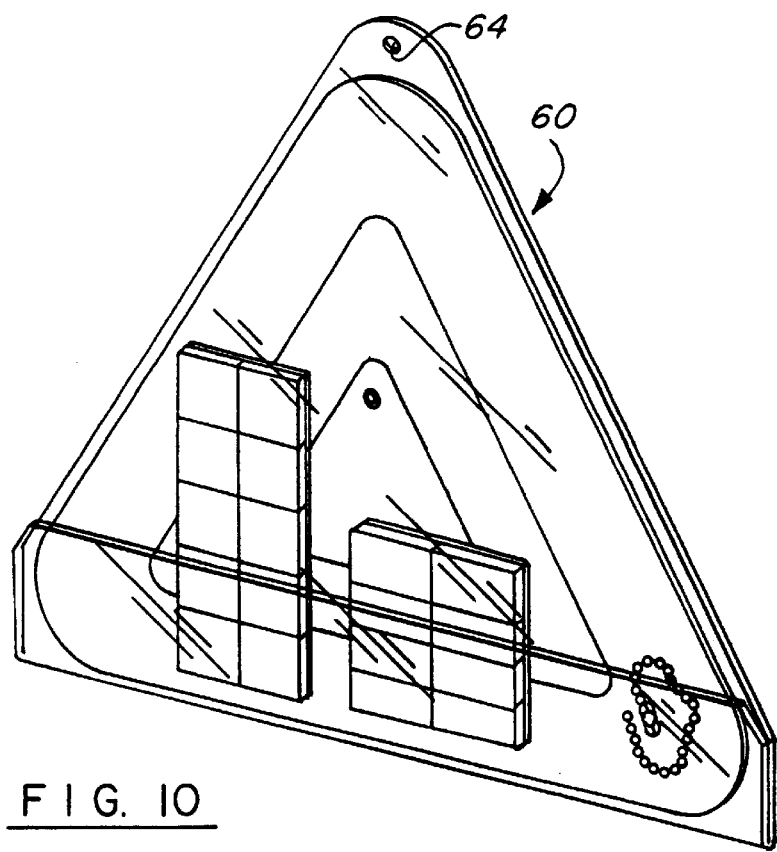
FIG. 10 illustrates a rear view of the kit of FIG. 9.

FIGS. 9–10 illustrate the assembled kit 60 that includes a cover 62 preferably made from a transparent material and has a shape which is preferably similar to the shape of the enclosed sheet of material. For example, the illustrated cover has generally a triangular shape. The cover 62 has a hole 64 adapted to receive a hook which is mounted to a vertical surface. Accordingly, instead of being placed in a glove compartment, the kit can be placed on an easily accessible surface within a passenger compartment.

Although the invention has been described with reference to a particular arrangements of parts, features and the like, these are not intended to exhaust all possible arrangements or features, and indeed many other modifications and variations will be ascertainable to those of skill in the art.

What is claimed is:

1. A light reflecting warning kit comprising:
    a sheet including at least one retro-reflective layer and having a combination of continuous seams arranged to define a plurality of reflective warning signs nested one within another between the seams, each of the warning signs being detachable from the sheet along a respective one of the seams upon applying an external force; and
    a means for attaching each of the reflective warning signs to an object in order to increase the object's conspicuity by reflecting a light beam in a direction reverse to a direction of light incidence.

2. The light reflective kit defined in claim 1 wherein the sheet further includes covering and a back-up layers completely enclosing the reflective layer therebetween.

3. The light reflective kit defined in claim 2 wherein the back up layer is selected from the group consisting of vinyl and urethane, said layers being sealed to one another by method utilizing either RF or sonic vibration techniques.

4. The light reflective kit defined in claim 1 wherein said sheet has at lest two seams spaced radially apart, each having a triangular shape to define a large outer warning sign, a small inner warning sign and an intermediate warning sign.

5. The light reflective kit defied in claim 1 wherein each of the warning signs has a polygonal shape.

6. The light reflective kit defined in claim 1 wherein the means for attaching the reflective warning signs is selected from the group consisting of magnets and adhesive pads.

7. The light reflective kit defined in claim 6, further comprising a ball chain, one of the warning signs having a hole receiving the ball chain in order to be attached to a garment of a user.

8. A method of assembling an emergency kit comprising the steps of:
    providing a retro-reflective sheet made of flexible plastic material, said sheet being provided with a plurality of seams which are arranged to define a plurality of detachable warning signs nested one within another between the seams;
    providing a means for attaching each of said warning signs to a vehicle or its driver to reflect a light beam in a direction reverse to a direction of light incidence; and
    placing said retro-reflective sheet and said means for attaching in one package in order to constitute the emergency kit.

9. The method defined in claim 8 wherein said flexible plastic material is selected from the group consisting of vinyl and urethane.

10. A light reflecting warning kit comprising:
    a sheet including at least one retro-reflective layer and having a combination of continuous seams arranged to define at least three reflective warning signs nested one within another between the seams, each of the warning signs being detachable from the sheet along a respective one of the seams upon applying an external force; and
    a means for attaching each of the reflective warning signs to an object in order to increase the object's conspicuity by reflecting a light beam in a direction reverse to a direction of light incidence.

* * * * *